April 28, 1942.　　　J. W. BRYCE　　　2,281,350
NUMBER DISPLAYING DEVICE
Filed April 10, 1940　　　7 Sheets-Sheet 1

INVENTOR.
James W. Bryce
BY Cooper, Kerr & Dunham
ATTORNEYS

April 28, 1942.  J. W. BRYCE  2,281,350
NUMBER DISPLAYING DEVICE
Filed April 10, 1940   7 Sheets-Sheet 2
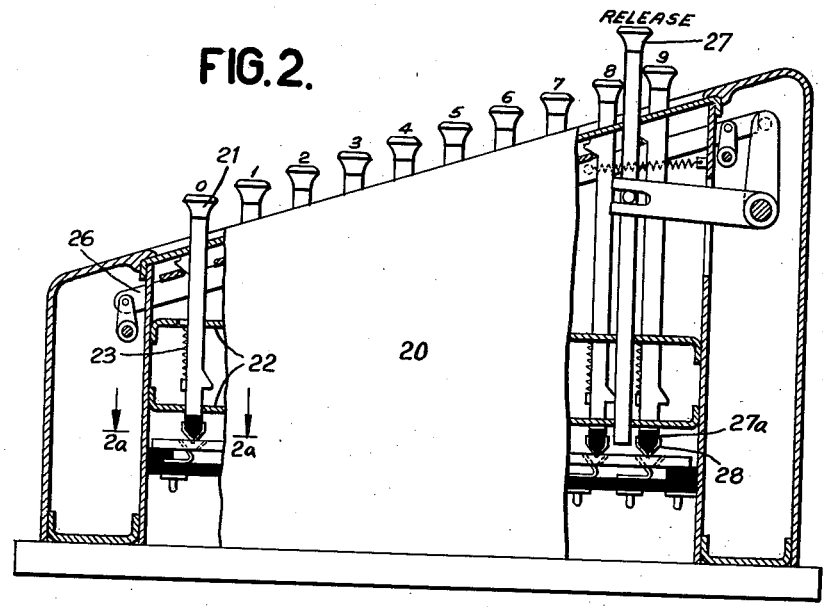
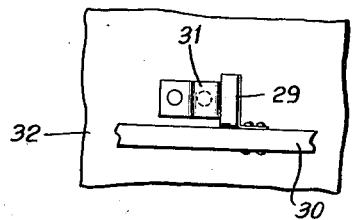
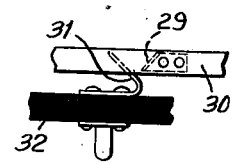
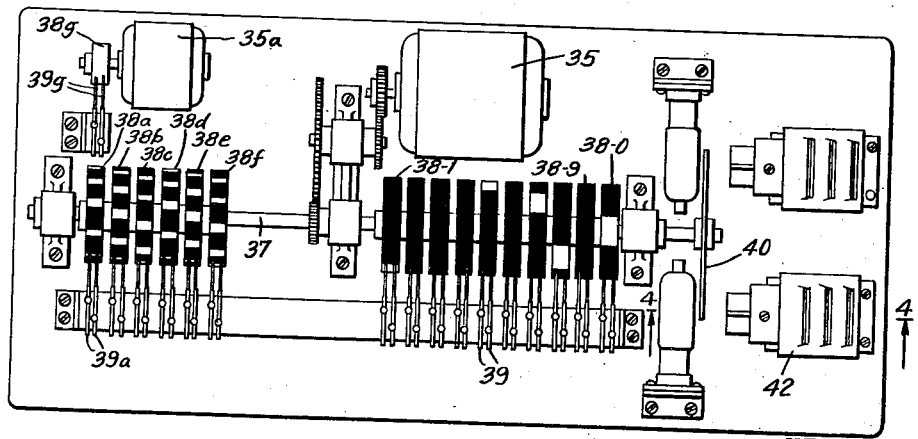
INVENTOR.
James W. Bryce
BY
Cooper, Kerr & Dunham
ATTORNEYS April 28, 1942.  J. W. BRYCE  2,281,350
NUMBER DISPLAYING DEVICE
Filed April 10, 1940    7 Sheets-Sheet 3
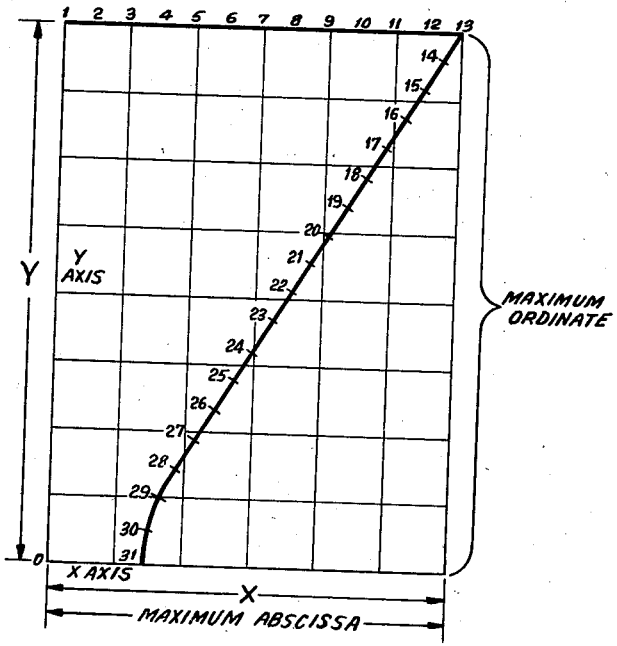
FIG. 6.
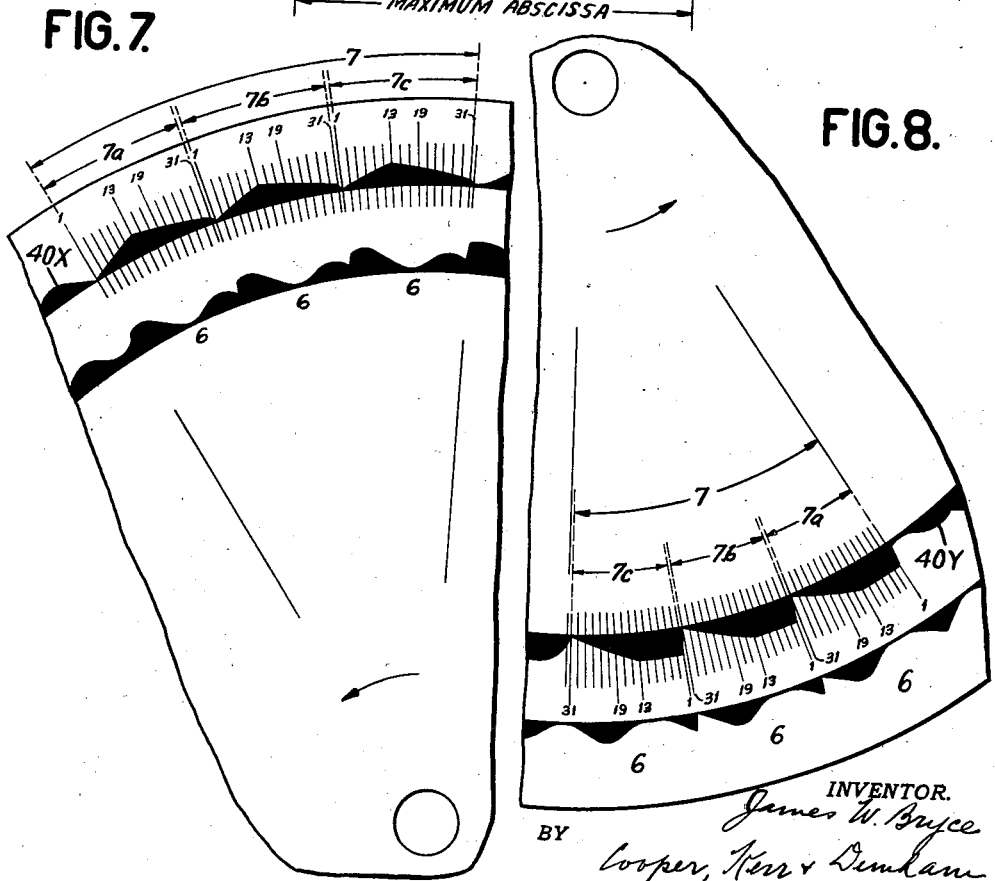
FIG. 7.
FIG. 8.
INVENTOR.
James W. Bryce
BY Cooper, Kerr & Dunham
ATTORNEYS April 28, 1942.   J. W. BRYCE   2,281,350
NUMBER DISPLAYING DEVICE
Filed April 10, 1940   7 Sheets-Sheet 4

INVENTOR.
James W. Bryce
BY Cooper, Kerr & Dunham
ATTORNEYS

April 28, 1942.  J. W. BRYCE  2,281,350
NUMBER DISPLAYING DEVICE
Filed April 10, 1940  7 Sheets-Sheet 5

| FIG. 9a. | FIG. 9b. |

| FIG.9aa. | FIG.9b. |

INVENTOR.
James W. Bryce
BY Cooper, Kerr & Dunham
ATTORNEYS

April 28, 1942.  J. W. BRYCE  2,281,350
NUMBER DISPLAYING DEVICE
Filed April 10, 1940    7 Sheets-Sheet 6
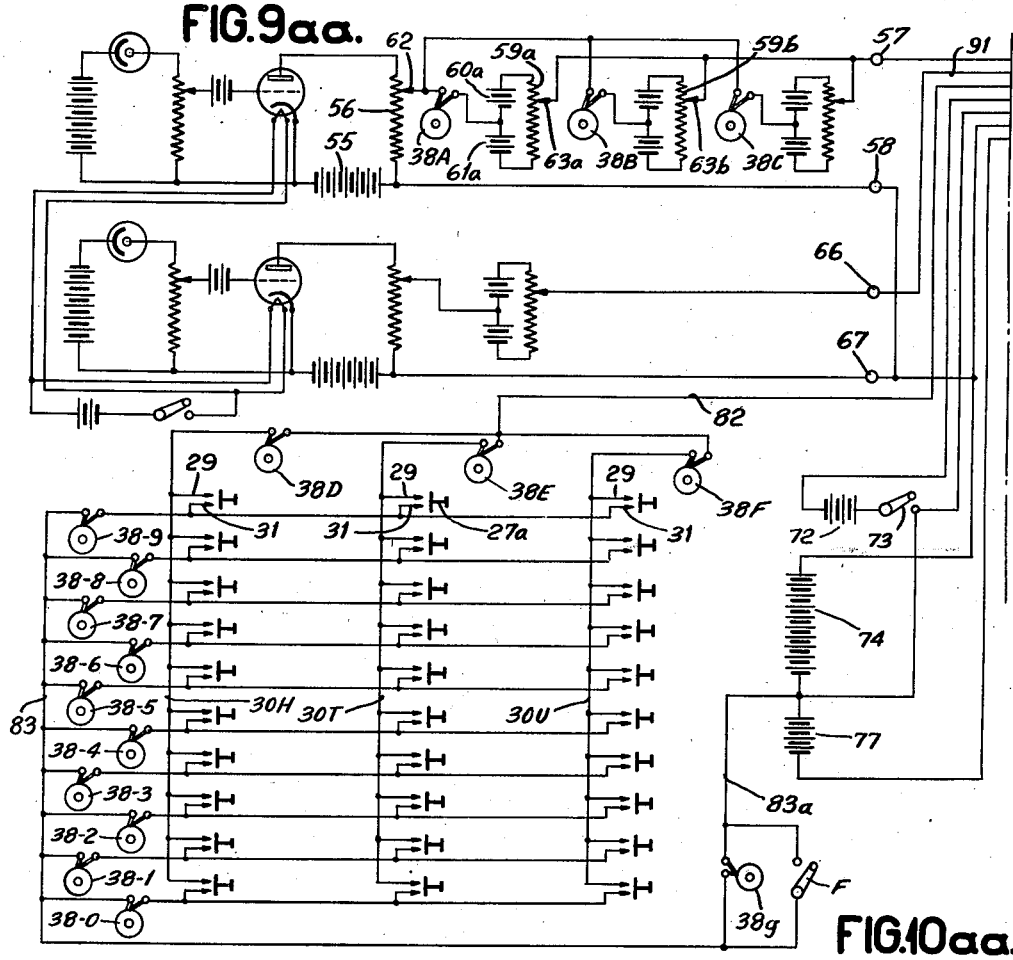
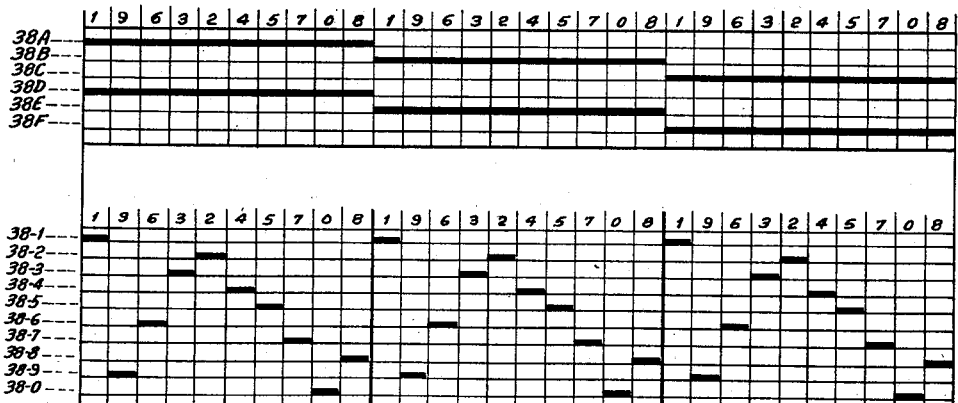
INVENTOR.
James W. Bryce
BY Cooper, Kerr & Dunham
ATTORNEYS April 28, 1942. J. W. BRYCE 2,281,350
NUMBER DISPLAYING DEVICE
Filed April 10, 1940 7 Sheets-Sheet 7
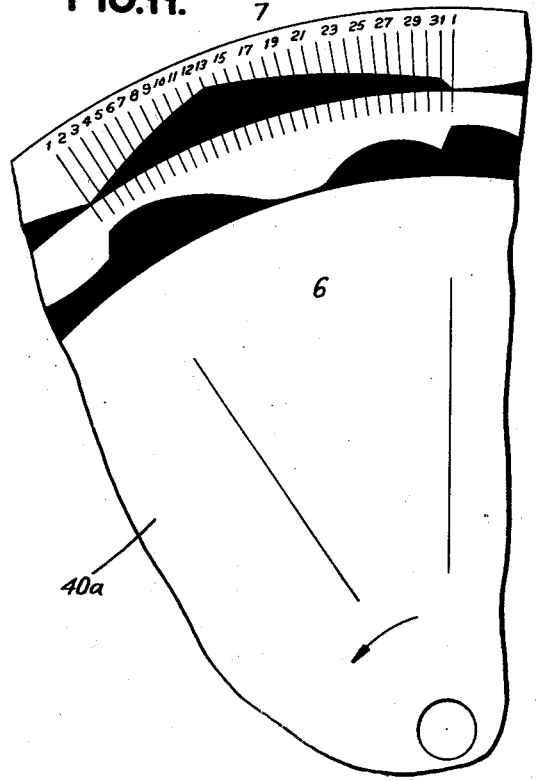
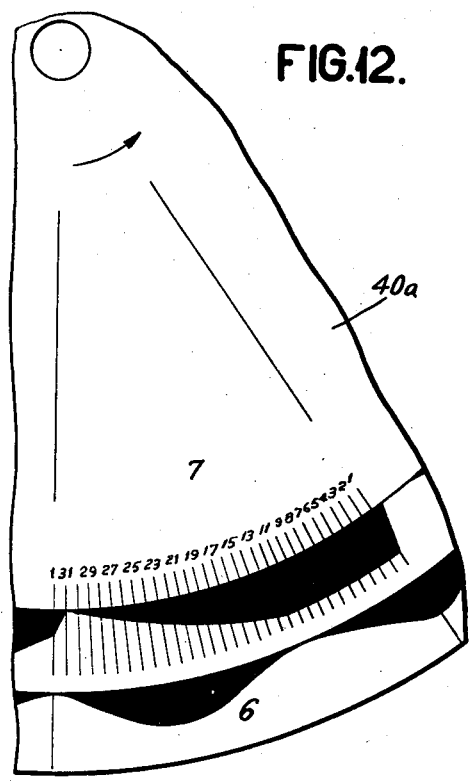
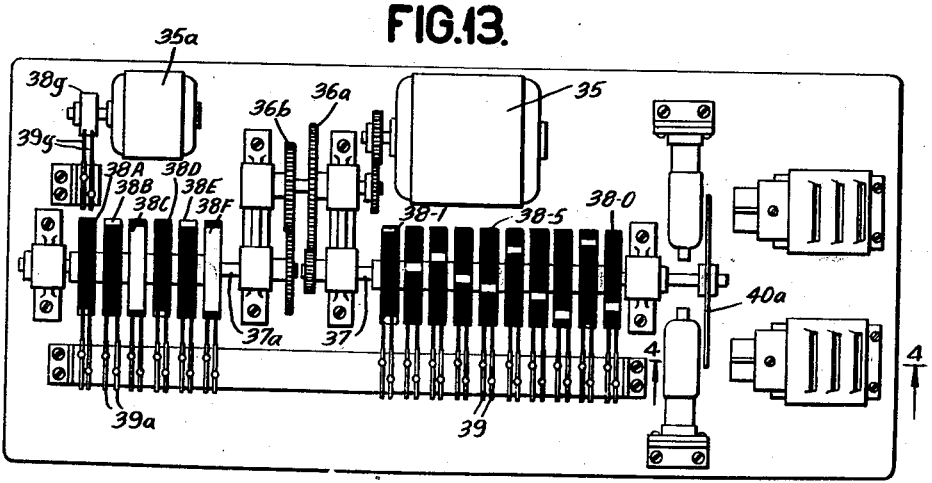
INVENTOR.
James W. Bryce
BY
Cooper, Kerr & Dunham
ATTORNEYS Patented Apr. 28, 1942

2,281,350

UNITED STATES PATENT OFFICE 2,281,350

NUMBER DISPLAYING DEVICE

James W. Bryce, Glen Ridge, N. J., assignor to International Business Machines Corporation, New York, N. Y., a corporation of New York Application April 10, 1940, Serial No. 328,850

8 Claims. (Cl. 177—337)

This invention is an improvement upon the device shown and described in the copending application of R. I. Roth, Serial No. 313,062, filed January 9, 1940. Here there was shown and described a display device wherein cathode ray tubes were utilized for displaying numbers at remote points from a control station. According to the previous invention, each display apparatus comprised a plurality of cathode ray tubes, one for each denominational order. One tube was used for units order, one for the tens order and one for the hundreds order.

The present invention is directed to and has for its objects an improvement and simplification of the foregoing device to the general end that a single cathode ray tube may be utilized to display a plurality of digits upon a common screen in a single tube. In this way for a three order display device only a single tube is required instead of three separate tubes as heretofore. In general the number of tubes is cut down by modifying the pattern component emitter unit so far as the track configuration is concerned. According to the previous invention a disk was provided which was scanned by photo-electric cells and this disk had successive segments or zones allotted to the different digits of the digital series.

According to the present invention the disk is changed in configuration whereby what may be termed the "digit zone" is further sub-divided into identical sub-zones. Thus during rotation of the disk on scanning the first sub-zone the related digit may be displayed on the cathode ray tube. Then on scanning the second sub-zone, the digit is re-traced on the same cathode ray tube screen and so on for the third sub-zone. With such repeat scanning and without further controls, it is obvious that the three same digits would be traced at the same area on the cathode ray tube screen and the effect would be to give a single display of a single digit only. To provide for multiple display on a single screen of a single tube, supplementary controls are provided so that varying control biasing voltages are superimposed so to speak upon the tracing voltages whereby a digit will be first displayed in a left hand zone on the screen and thereafter the same digit will be displayed in the middle zone of the screen of the same tube and thereafter the same digit will be displayed in a third zone of the same tube. It will be appreciated that by such an arrangement it will be possible to display the same digits in three different places on a common cathode ray tube screen. Thus one could have a display of 111, 222, 333, etc. However, in practice such an arrangement would be of little utility and accordingly further controls are provided so that it is possible to concurrently display different digits on a single screen of one tube. It may be mentioned that the display of a digit in one area occurs at a slightly different time than a display of a like or different digit upon another area of the screen of a single tube, but due to the high rotational speed which is employed in driving the disk, the repeated tracing occurs in such rapid recurrence that the effect is a concurrent display in all three fields.

Accordingly, the object of the present invention resides in the provision of means to display a character or characters in different lateral zones upon the screen of a cathode ray tube.

A further object resides in the provision of novel biasing controls and timing controls to cause display in different lateral zones to be effected successively.

A further object of the present invention resides in the provision of a simplified control device for providing the tracing potentials whereby a plurality of different or like characters may be displayed at different zones of a tube or tubes thereby enabling the number of tubes to be reduced.

A further object of the present invention resides in the provision of a cathode ray tube character displaying device wherein a plurality of different or like characters may be displayed on different lateral zones of a cathode ray tube or upon such zones of a set of tubes and wherein the control element or rotatable light track disk or light modifying element is of simple configuration without subsections. Provision is made for driving this element through a plurality of revolutions and displaying a character in one zone upon the first revolution in a different zone on the second revolution and in a third zone upon the following revolution.

Further and other objects of the present invention will be hereinafter set forth in the accompanying specification and claims and shown in the drawings which show by way of and what I now consider to be the best mode in which I have contemplated applying that principle. Other embodiments of the invention employing the same or equivalent principle may be used and structural changes made as desired by those skilled in the art without departing from the present invention and within the spirit of the appended claims.

In the drawings:

Fig. 2 is a partly side elevational view and partly sectional view of the keyboard section of the apparatus;

Fig. 2a is a detail view of one pair of key controlled contact devices, the view being taken substantially on line 2a—2a of Fig. 2 and looking in the direction of the arrows;

Fig. 2b is an enlarged view of certain contacts shown in smaller scale on Fig. 2;

Fig. 3 is a top view of the control apparatus with the cover removed to show the parts within the housing;

Fig. 6 is a diagrammatic graph view showing plotting points for the character 7;

Figs. 7 and 8 are enlarged details of portions of certain segment sections of the disk shown in smaller scale in Fig. 5;

Figure 9A:
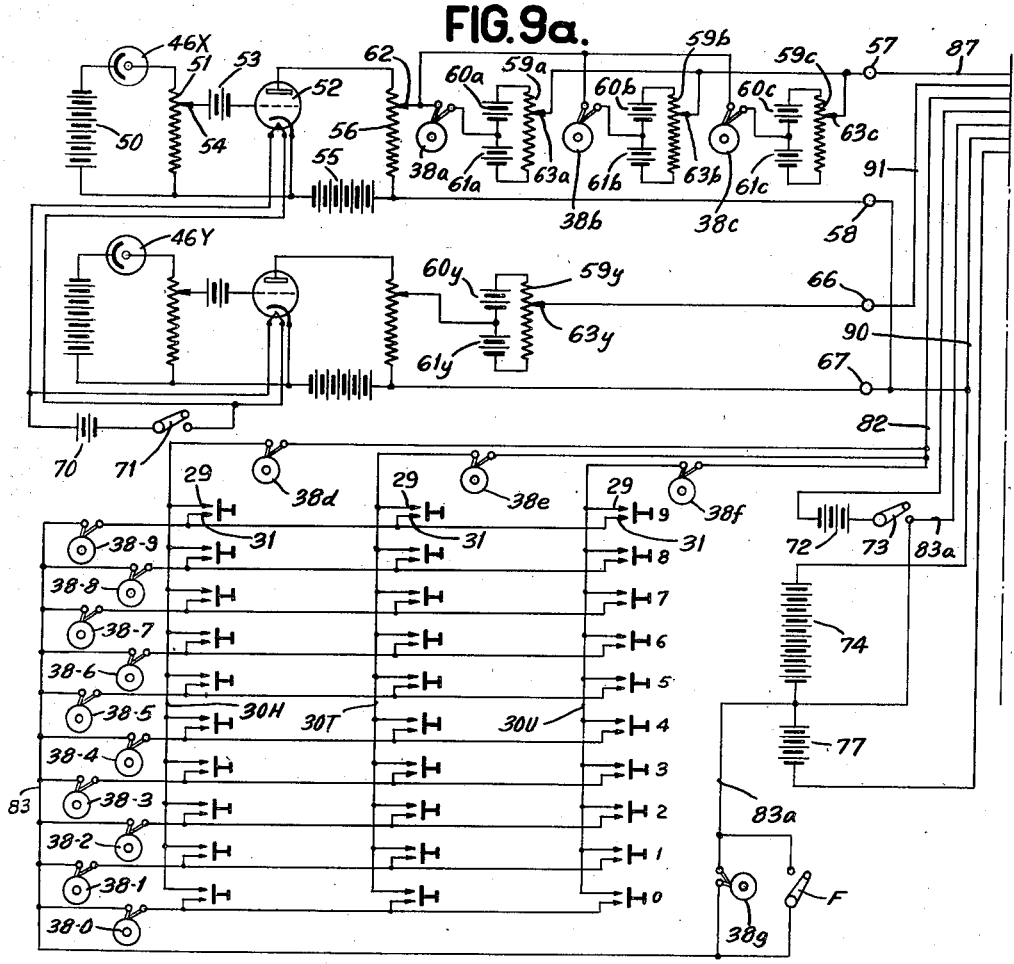
Figure 10:
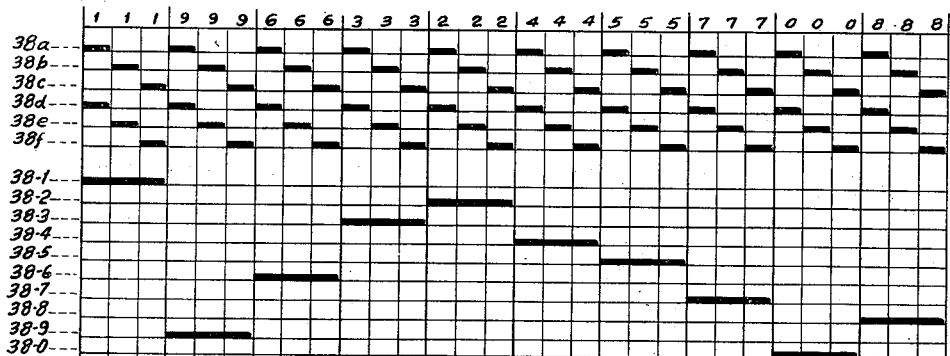
Figure 9B:
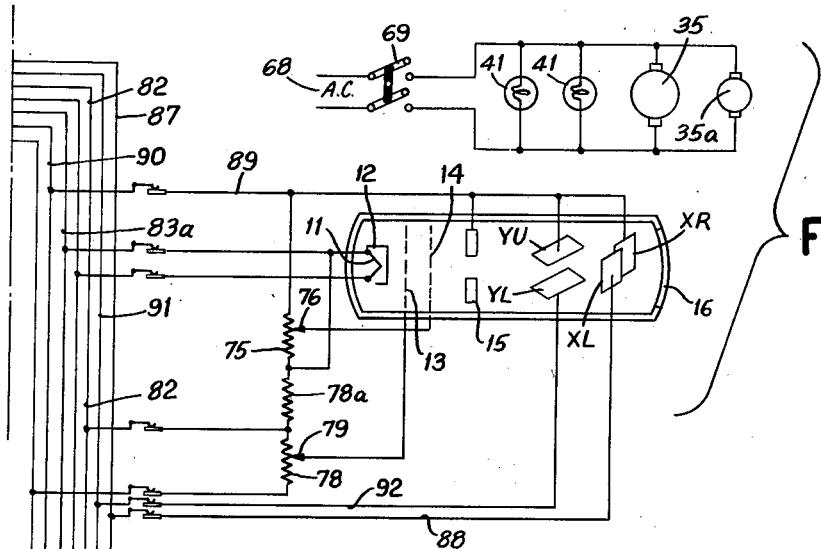
Figure 14:
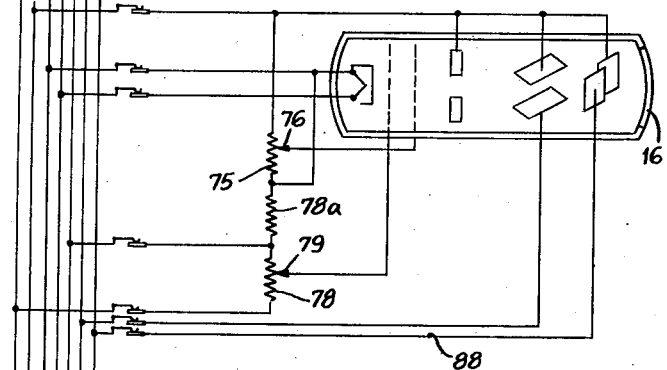
Figure 15:
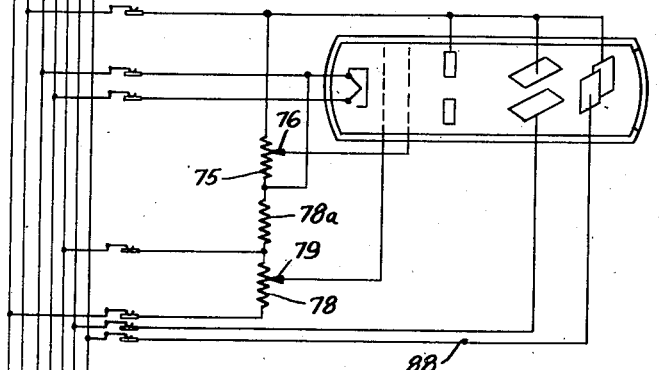

Figs. 9a and 9b taken together with Fig. 9b to the right of Fig. 9a as indicated in diagrammatic view, Fig. 14, show the complete circuit diagram of the apparatus which constitutes one embodiment of the invention;

Figs. 9aa and 9b taken together with Fig. 9b to the right of Fig. 9aa as indicated in diagrammatic view, Fig. 15, show the complete circuit diagram of the apparatus constituting a modified embodiment of the invention;

Fig. 10 is a commutator timing diagram of the apparatus which comprises the main embodiment of the invention;

Fig. 10aa is the commutator timing diagram of the apparatus which comprises the modified embodiment of the invention;

Figs. 11 and 12 are views similar to Figs. 7 and 8 but show enlarged details of certain segment sections of the disk which are used in the modified embodiment of the invention;

Fig. 13 is a top plan view similar to Fig. 3 but showing the control apparatus utilized for the modified embodiment of the invention; and Figs. 14 and 15 are diagrammatic views showing the manner in which the circuit diagram sheets are to be placed together for the main and modified embodiments.

Before describing the system in detail, it may be stated to comprise several display units, a control apparatus and a selecting unit in the form of a keyboard. Each display unit comprises a single cathode ray tube and provision is made so that the single tube can concurrently display several digit characters. In the present embodiment each cathode ray tube of each display unit is capable of displaying three orders of digits. The other parts of the system include a simplified form of pattern component emitter unit which generates and transmits sets of changing potentials to the cathode ray tubes so as to control the latter for the proper display of digital characters on the screens thereof. The control apparatus also includes timing selectors which operate synchronously and in timed relation with the pattern component emitter unit. These timing selectors are brought into operation and kept out of operation under the control of the keyboard unit. An operator of the keyboard unit, if it is desired to transmit to one or more distant points number indications such as a call number, may depress the proper number keys on the keyboard and this will bring about such control that all of the distant display units will concurrently display the same numbers. Provision is made for a steady display of numbers or for a flashing display of numbers as desired.

In more detail, referring first to Figs. 2, 2a and 2b, 20 generally designates the keyboard unit. It is of the conventional 81 key type, but for simplicity of illustration, only three columns of keys have been shown. The keys 21 are guided for vertical movement by means of perforated plates 22. They are spring retracted upwardly by springs 23. The keys are latched down in the customary way by detent members carried on detent bars such as 26. The keyboard is of the flexible type and a release key 27 is provided which, upon depression, shifts all of the bars 26 and releases all of the keys. Each key at its bottom carries an insulated portion 27a which in turn carries a V-shaped contact member 28. Upon depression of any key, the contact member 28 establishes contact with a contact member 29 carried on a bar 30 and with an individual contact member 31 carried on an insulating support 32.

GENERAL CHARACTERISTICS OF CATHODE RAY TUBES

Before describing the details of the indicating device and the control therefor, certain general characteristics of cathode ray tubes which are used in the distant indicator will be briefly described. Several typical and suitable cathode ray tubes are illustrated diagrammatically on the circuit diagram (Fig. 9b). Each tube comprises an evacuated body into which extends a heater element 11. Associated with the heater element is a cathode 12 providing a source of electrons. Also in the evacuated body and disposed in the order from left to right are a grid 13, an anode number "1" designated 14, an anode number "2" designated 15, and two pairs of deflector plates or electron deflection control elements. The upper and lower vertical deflector plates are respectively designated YU and YL and the horizontal deflector plates are respectively designated XL and XR. XL signifies horizontal deflection to the left and XR signifies horizontal deflection to the right. YU signifies upward vertical deflection and YL signifies lower or downward vertical deflection. The right hand end of the cathode ray tube includes the usual fluorescent screened end 16. The "Y" deflector plates are plates above and below the center axis of the tube. The "X" deflector plates are disposed to the right and left of the center axis of the tube.

In operation of a cathode ray tube, if no potential is applied to either sets of plates, the stream of electrons will be emitted along the central axis of the tube and impinge on the fluorescent screen 16 at the center of the screen. If, however, the potential on the horizontal and vertical deflecting plates is changed, the stream of electrons can be deflected either upwardly or downwardly or to the right or to the left or in combined resultant directions. Changing relative potential on the Y set of plates will bring the stream of electrons up or down and similarly changing the relative potential on the X plates will direct the stream of electrons alternatively to the right or left. By providing proper potential and proper changing potential over a period of time on both sets of plates any desired figure or figures or character or characters can be traced and properly displayed on the fluorescent screen 16. By repeatedly tracing the beam of electrons to the proper points or areas of the screen, an image can be produced which can be visibly read in the day time or at night. Cathode ray tubes are adapted to operate and deflect electron beams at an exceedingly high frequency. They may accordingly be termed "inertia free image tracing devices." Such devices furthermore require a mere change of voltage on the plates to deflect the electron stream and current consumption is negligible. This low current consumption adapts these tubes for use as indicators at a considerable distance from the control point. Control of brilliance is afforded by applying proper potential to the grid 13. Grid 13 is always negative with respect to the cathode 12 and by decreasing the negative bias on grid 13, brilliance can be increased. By increasing the negative potential upon grid 13 the beam impingement upon the screen can be wholly suppressed.

Anode number "1" designated 14 is used to control the focus of the beam upon the screen. Anode #1 is always positive with respect to the cathode 12 and a variable resistance device 75—76 can be adjusted to afford the proper potential to sharply focus the beam on the screen 16. Anode #2 designated 15 is the conventional accelerating anode used in cathode ray tube devices of this class.

Having generally described the characteristics of the cathode ray tubes there will now be described one manner of providing the deflecting voltages which control the movements of the electron beams for tracing the images upon the various cathode ray tube screens.

*Pattern component emitter unit*

Figure 1:
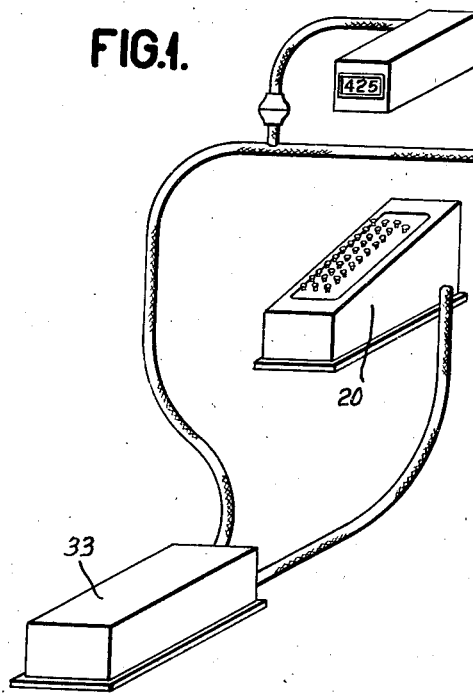
Figure 1 is a perspective diagrammatic view of the complete system showing several distant indicators, a controlling keyboard and a component emitter unit, together with amplifiers and associated parts.

33 in Fig. 1 designates a box which contains both the pattern component emitter unit and certain amplifying apparatus. Mounted within this box (see Fig. 3) there is a driving motor 35. This motor by the gearing shown is adapted to drive a shaft 37 which is suitably mounted for rotation. The shaft 37 is adapted to drive two sets of commutator devices. The right hand set of commutators comprises ten commutators, one of which commutators is designated 38 in Fig. 3. Each of these commutators (see Figs. 9a and 10) comprises an insulated portion over the greater portion of the periphery of the commutator with a conducting portion at a single point upon the commutator. Trailing on the periphery of each commutator 38 is a pair of brushes which are designated 39 on Fig. 3. The conducting segments on the different commutators of the right hand set are so arranged to close at different angular positions of rotation of the shaft 37 as will be readily understood by inspection of Fig. 9a and the commutator timing diagram Fig. 10. The purpose of these commutators and their timing will be subsequently explained.

Referring now to the left hand group of commutators, this set of commutators comprises six commutators which are respectively designated 38a, 38b, 38c, 38d, 38e and 38f. The left hand set of commutators each have ten sets of conducting portions as will be apparent from the timing diagram (Fig. 10). Trailing on these conducting portions are pairs of brushes, one pair of which is designated 39a in Fig. 3. The purpose of this left hand set of commutators and their timing will be subsequently further explained.

Figure 4:
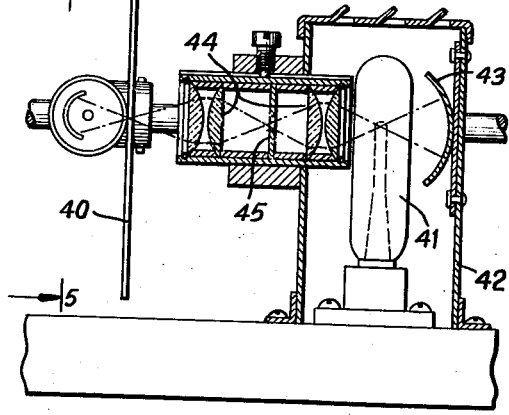
Fig. 4 is a detail sectional view taken on line 4—4 of Fig. 3.

Again referring to Figs. 3 and 4, the shaft 37 is also adapted to drive and rotate an element such as a disk 40. This disk 40 (see also Fig. 5) is generally transparent, but it is provided with two opaque concentric tracks 40X and 40Y. To direct light to these tracks a pair of light sources are provided. Each source of light preferably includes a lamp 41 (see Fig. 4) within a lamp box 42. A suitable reflector 43 directs the light from the lamp through a lens system 44 and through an apertured diaphragm 45 so that the light is directed and concentrated onto and through the related partially opaque track. One light source directs light to and through the 40X track and the other light source directs light to and through the 40Y track. Upon the opposite side of the disk 40 from the light source there are provided two photo-cells which are respectively designated 46X and 46Y.

It may be explained that if the width of one of the tracks such as 40X is varied at different angular positions around the disk 40, different amounts of light will be allowed to pass to the photo-cell 46X upon rotation of the disk. This variable illumination will vary the current and/or voltage output in a circuit controlled by this particular photo-cell. The photo-cells act to allow more or less current to flow in their output circuits depending upon the amount of light which they receive.

Referring again to Fig. 5 it will be noted that the disk 40 is shown as divided up into segment portions each of which has a designating figure such as 0, 1, 2, etc. up to 9.

Figure 5:
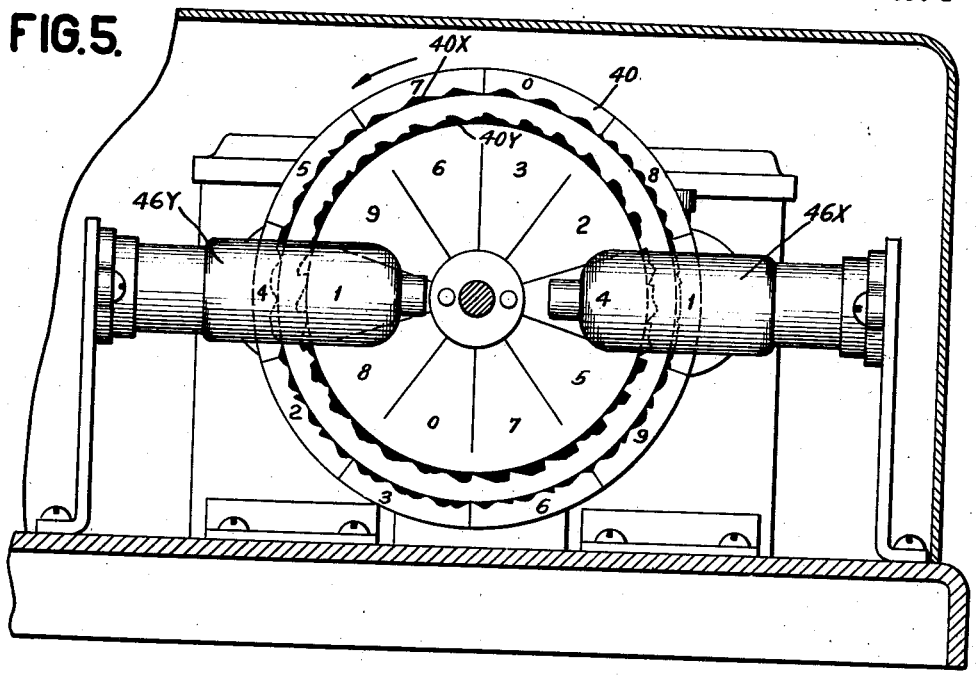
Fig. 5 is an end view of the part of the apparatus shown in Fig. 4, the view being taken on line 5—5 of Fig. 4 and looking in the direction of the arrows.

Referring to Figs. 5, 7 and 8, it will be further noted that each numbered segment section is further divided into sub-sections. The 7 section, for example, is divided into three identical sub-sections which are respectively designated 7a, 7b and 7c on Fig. 7. It may be explained that the 40X track for a given sub-section such as 7a will provide a variable amount of light to influence the related photocell 46X whereby it supplies changes in potential and component voltages to the X plate of the cathode ray tube or tubes for effecting horizontal deflection for tracing the character 7. Similarly, the 40Y track for the related sub-segment section 7a controls the 46Y photocell whereby the proper changing potential is applied to the Y plate to effect vertical deflection for tracing the character 7. As the disk rotates further and traverses the 7b section there will be a repeated generation of the voltage for tracing the character 7. Likewise there will be a repeated voltage generation on traversing the 7c section.

Inasmuch as the two lamp sources for the different tracks are 180 degrees apart, the related sections of the opaque tracks are similarly displaced 180 degrees with reference to one another for a corresponding digit. This 180 degrees relation of the tracks is shown in Figs. 7 and 8. The outside track of Fig. 7 is the track for repeatedly controlling the changing potential on the X plates for tracing the digit 7. The inside track on Fig. 8 on the other hand, is the track for controlling the changing potential on the Y plates for tracing the digit 7.

The manner of laying out the various sub-segment sections of the disk will now be explained.

Referring to Fig. 6, on this figure, the outlines of the numeral 7 have been laid out. The numeral 7 has been divided into a set of sections of equal length, this particular character being divided into sections 1 to 31 inclusive. In order to trace the electron beam for the upper horizontal part of the character 7 the Y component voltage should be maintained constant while points 1 to 13 are traced. If the inner track (for controlling the Y potential) on Fig. 8 be examined it will be found that the 40Y track has a constant maximum width for all points from 1 to 13 inclusive. Thereafter for further points along the figure 7 (see Fig. 6) the tracing beam should be caused to both descend and move to the left. To cause descent of the beam there is a gradual diminution of the width of the 40Y track from point 13 (Fig. 8) back to point 31. It will be understood that the 40Y track has a like configuration in sections 7b and 7c.

Referring now to the 40X track (Fig. 7) the X component at point 1 is 0. From this point 1 to point 13, the 40X track gradually increases in width as indicated on Fig. 7, see sub-segment section 7a. From point 13 back to point 31, the 40X track progressively diminishes in width.

Referring to Fig. 7, it will be noted that there is a zone allotted from point 31 to point 1. This provides for the return of the beam from the terminating tracing point 31 to the beginning point 1 of the next sub-segment section.

To determine the width of the 40Y track at any point, as for example, point 19, the Y ordinate distance on Fig. 6 between the X axis and point 19 is determined. This distance is then multiplied by a constant, the value of which is to be determined in a manner to be subsequently explained. The resulting amount will give the width of the Y track at point 19 on the disk.

The constant above referred to is the ratio of a predetermined arbitrary maximum width of the Y track on the disk with respect to the maximum ordinate value for the character in Fig. 6. This arbitrary value depends upon the circuit relations and characteristics of the photocells and amplifier tubes which are used in connection with the track.

The width of the "X" track at point 19 is the X abscissa distance between the Y axis and point 19 multiplied by another constant. This constant is the ratio of the predetermined arbitrary maximum width of the X track with respect to the maximum abscissa value for the character in Fig. 6. This arbitrary value again depends upon the circuit relations and characteristics of the photo-cells and amplifier circuits.

Fig. 5 shows the configuration of the X and Y tracks for controlling related photo-cells so that the cathode ray tube or tubes will successively display all of the different digits of a set, i. e. from 1 to 9 and 0 inclusive, and for also providing repetition of display of a particular single digit. In other words, taking for example the character 7 it is possible to display this digit 7, three times in succession. Such display of this same digit may be effected upon three different portions of the screen of a single tube. Each complete track is divided into a number of main segment sections, one main segment section for each different digit. Each main segment section is divided into three sub-segment sections for the same digit. The main segments of both tracks are shown numbered with digits which comprise the digit displayed by the cathode ray tubes when that particular main segment is being scanned by the photo-cells. As shown in Fig. 5, the 46X photo-cell is scanning the 1 main segment of the 40X track while the 46Y photo-cell is scanning the 1 main segment of the 40Y track. The different main segments related to different digits are scanned in succession and the different sub-sections of each main section are also scanned in succession. It will be noted that the successive main segment sections do not follow the successive order of the digits. However, they can be transposed in position on the disk to follow the order of the digits or they can be indiscriminately arranged as shown.

With the disk 40 in continuous counterclockwise rotation, the 46X photo-cell will receive varying amounts of illumination as to successively afford changing potential for first tracing the outline of the character 1, then repeating the tracing of the outline of the character 1 twice and then as the next segment is reached the character 9 in repetition and so on. Then for the next main segment, the character 6 repeatedly, then 3 repeatedly, then 2 repeatedly, 4 repeatedly, 5 repeatedly, 7 repeatedly, 0 repeatedly and 8 repeatedly and then recurring with the character 1. The other photo-cell 46Y will, upon rotation of the disk 40 from the position shown, first trace the character 1 three times in succession, then 9, three times, then 6 three times, then 3 three times, then 2 three times, then 4 three times, then 5, 7, 0 and 8 three times and then repeat with 1 again.

From the foregoing explanation, it will be understood that if both light sources were on and both photo-cells were in circuit through certain amplifiers for a given cathode ray tube, as the disk 40 rotates through one complete revolution all of the various characters comprising the digits 1 to 9 inclusive and 0 would be successively traced on a cathode ray tube screen. Furthermore, each character would be repeatedly traced three times on movement of the disk through the three different sub-segment sections. The order of succession in which the different characters are traced by any one tube would be 1—1—1, 9—9—9, 6—6—6, 3—3—3, 2—2—2, 4—4—4, 5—5—5, 7—7—7, 0—0—0, 8—8—8 and thereafter there would be a repeated tracing of the same characters in the order mentioned.

It may be mentioned that provision is made through certain circuit control devices to be hereinafter described, for displaying a character at different lateral positions on the cathode ray tube screen. A certain circuit control provides for the display of the character 4, say at the extreme left of the screen or in the middle of the screen or at the right of the screen. In other words, the control is such that if a single character such as 1 is to be repeatedly traced, the position of display can be made to vary laterally with respect to each successive tracing.

It may be mentioned that the disk 40 is rotated extremely rapidly and the rate of rotation is such that a visual image will be displayed which can be seen even if the cathode ray tube is operative only for one sub-segment position of the disk. To provide for such single sub-segment section visual display the commutator devices 38, 38a, 38b, 38c, 38d, 38e and 38f are provided. The selective control afforded by these commutators will be more fully explained hereinafter, but it may be stated generally that the 38 commutators effect segment selection of the main segment sections, whereas the left hand set of commutators effect sub-segment selection.

The disk device just described constitutes what might be termed "a pattern component emitter unit" and if such disk is maintained in a state of rotation at relatively high speed it will be appreciated that such disk can be used to progressively vary the X component voltages and the Y component voltages which are applied to the deflecting plates of the cathode ray tube or tubes to afford display of one or more characters and to also afford display of a single character repeatedly. It may be further explained that a single disk unit can be utilized for controlling one or more cathode ray tubes.

Before describing the commutator and switching control for the various cathode ray tubes, the amplifier circuits for the photo-cells will be explained.

*Photo-cell and amplifier units*

As explained before two photo-cells 46Y and 46X are employed.

Amplifier circuits preferably including electron discharge devices are controlled by the photo-cells 46X and 46Y. These amplifier circuits are adapted to produce variations in potentials across the deflecting plates of the cathode ray tubes in accordance with the variations of light impressed on the photo-cells.

Consider, for example, photo-cell 46X (Fig. 9a) which is utilized to control the horizontal deflection of the cathode ray beam in one or more of the cathode ray tubes. Such photo-cell 46X is connected in series with a battery 50 and a resistor 51 whereby the difference of potential across the resistor varies in accordance with the illumination of the photo-cell. The grid cathode circuit of a vacuum tube 52 conveniently biased negative at all times by the battery 53 includes a portion of the resistor 51 preliminarily adjustable by a contact 54 on the resistor. The plate cathode circuit of the tube 52 includes a B battery or other source of direct current 55 and a resistor 56 in series therewith intermediate the positive side of the battery 55 and the plate of the tube 52. For impressing a proper voltage across the horizontal deflecting plates XL and XR of the cathode ray tubes which are connected to the terminals 57 and 58 of the amplifier unit, three sets of biasing networks are provided, the first biasing network comprises a resistor 59a connected across a source of voltage preferably comprising series connected batteries 60a and 61a. The conductor intermediate batteries 60a and 61a is connected through a circuit established by the 38a commutator to a preliminarily adjustable contact tap 62 on the resistor 56. The terminals 57 and 58 are respectively connected to a preliminarly adjustable contact tap 63a co-operating with the resistor 59a and to the positive side of the battery 55, i. e. the positive end of the resistor 56.

As explained before, there are three sets of biasing networks. The second network includes resistor 59b, tap 63b, series connected batteries 60b and 61b with the circuit connection between the batteries extending to the commutator 38b. The commutator circuit is completed back to contact tap 62. The other and last biasing network comprises resistor 59c, tap 63c, batteries 60c and 61c. The midpoint between these batteries connects back to commutator 38c, the commutator circuit again being completed to tap 62.

As will be noted from the timing diagram (Fig. 10) commutators 38a to 38c close in succession. The biasing relations of the respective networks are such that with commutator 38a closing the numeral will be displayed on the left of the cathode ray tube. On the other hand if the 38b commutator closes its biasing circuit the numeral will be displayed in the center of the tube, whereas with the 38c commutator closing, the numeral will be displayed on the right of the cathode ray tube screen. Obviously the relations could be changed as desired.

It will now be seen that if the photo-cell 46X receives illumination or a predetermined maximum illumination the grid of the tube 52 will have a predetermined maximum negative bias. The contact arms 54, 62, 63a, 63b and 63c are conveniently so adjusted (in a manner which will be readily understood by those familiar with the art) that for this maximum illumination of the photo-cell 46X the resulting maximum negative bias on the grid on the tube 52 will be such that the output voltage between the terminals 57 and 58 will maintain the electron beam at one side of its horizontal path of travel, at the left hand side of the left hand zone if commutator 38a is effective, at the left hand side of the middle zone if commutator 38b is effective or at the left hand side of the right zone if commutator 38c is effective.

As explained before, each cathode ray tube screen may be said to have three display zones. The left hand zone being the zone for the highest order digit, the right hand zone for the lowest order digit and the middle zone for the intermediate order digit, that is, although the contact arm 62 is negative with respect to the positive side of the battery 53, the biasing networks including the resistors 59a or 59b, or 59c, establish such voltage conditions upon the deflector plates XL, XL so as to make the terminal 57 just sufficiently positive or negative with respect to the terminal 58 to maintain the electron beam in its extreme left hand position in the related zone. The voltage on 57 is positive with respect to 58 to place the electron beam in the left position in the left or middle zone and is negative with respect to terminal 58 to place the electron beam in the left hand position of the right hand zone.

Consider the commutator 38b effective with the illumination of cell 46X decreasing due to an increase in width of the opaque portion of the track. Under such conditions the negative bias on the grid of the tube 52 decreases, resulting in an increase in plate current and corresponding increase of the potential drop between the positive side of the battery 55 and the contact 62. As a result the potential of terminal 57 becomes less positive with respect to the terminal 58. The adjustments of the contacts 62 and 63b are preferably such that the potential between the terminals 57 and 58 become zero with the 38b commutator effective for an illumination of the photo-cell which is intended to represent a positioning of the cathode ray beam in the middle of its horizontal path. Decrease of the illumination beyond this point results in making the terminal 58 positive with respect to the terminal 57 until at the point of minimum illumination the cathode beam is deflected to its extreme right hand position in the middle zone.

It will be understood that a similar action so far as deflection of the electron beam on the screen is concerned, takes place when commutator 38a is effective or when commutator 38c is effective. It may be mentioned, however, that when there is to be a display on the right hand zone with commutator 38c effective a decrease in illumination causes terminal 57 to become increasingly negative with respect to terminal 58. Also when commutator 38a is effective a decrease in illumination causes terminal 57 to become less positive with respect to terminal 58.

It will be understood that the amplifier and balancing circuits controlled by the photo-cell 46Y are conveniently identical with those herein above described for the photo-cell 46X except a single biasing network including batteries 60y, 61y, resistor 59y, tap 63y is provided in lieu of the triple biasing network for the other photo-cell. Accordingly, the vertical displacement of the cathode ray beam between plates YL and YU is obtained by corresponding similar variation in output potential between the terminals 66 and 67 to which these plates are connected. It will be understood that the triple biasing network is not required for the Y plates because the characters are always maintained at the same height and relative level.

Since it will now be understood that the actual position of the cathode ray beam at any instant depends upon the controlling potentials applied to both sets of deflecting plates XL, XR and YL, YU, the position of the beam is directly controlled (through the instrumentality of the amplifier circuits described) by the amount of illumination respectively received by the photo-cells 46X and 46Y. Thus as the illumination respectively received by these photo-cells varies during rotation of the pattern component emitter, the cathode ray beam of any one of the tubes traces a path to portray the particular digit character corresponding to the main segment and subsegment of the disk which is being scanned by the photo-cells. If the tracks of a sub-segment of the main segment portion pertaining to the digit 7 are being scanned, such scanning so controls the illumination of the photo-cells that the tracks 40X and 40Y respectively provide a predetermined variation in the illumination of the photo-cells 46X and 46Y for each traverse of a sub-segment of the disk providing resultant corresponding variations in deflecting potentials on the plates of the cathode ray tube or tubes, whereby the cathode ray beam traces a path, in this case, a path depicting the character 7 which is predetermined by the main segment of the disk which is being scanned. As shown on Fig. 9b, the lamps 41 and the motor 35 may receive current from a suitable source 68 through a suitable switch 69. This current supply is also afforded to a supplemental motor 35a, the purpose of which will be subsequently described.

The heater elements of the amplifying tubes 52 are preferably arranged to receive current from a suitable source 70 upon closure of switch 71 (Fig. 9a). A battery 72 (Fig. 9a) affords current supply for the heater elements of the cathode ray tubes upon closure of switch 73 (Fig. 9a), suitable circuits extending from the battery and switch to the heater elements 11 of the various tubes (see Fig. 9b).

As is customary with cathode ray tube practice, a biasing battery 74 is provided. Such biasing battery is connected through suitable circuits to resistors 75 at each cathode ray tube. A contact tap 76 on this resistor connects to anode 14 (the number "1" anode of the cathode ray tube). Adjustment of the contact tap on the resistor provides the focusing adjustment of the electron beam. Also as is customary in cathode ray tube practice, the commonly used deflector plates YU and XR and the number "2" anode designated 15 are commonly connected to the positive end of the resistor 75.

Before describing the keyboard switching control for the cathode ray tubes, it may be again mentioned that if grid 13 of any one tube has applied to it a certain maximum negative bias the effect will be to wholly suppress the impingement of the electron beam upon the fluorescent screen 16. On the other hand if this certain maximum negative bias is reduced on the grid 13, the effect will be to allow the impingement of the beam on the screen. To provide such grid bias control a battery 77 is provided (Fig. 9a), which at each tube is shunted by resistors 78 and 78a. Cooperating with the resistor 78 is a contact tap 79 which connects to the grid 13. The positive end of resistor 78a is connected back to the cathode heater element 12. If both resistors 78a and 78 are in circuit with the battery 77 the certain maximum negative bias previously mentioned will be applied to the grid 13. On the other hand if resistor 78a is shunted out (in a manner to be described) then this certain maximum negative bias will be reduced to allow impingement of the electron beam.

The application of maximum negative bias and the reduction of this maximum negative bias for a particular tube or tubes is controlled from the 38 commutator devices previously mentioned. For example, if it is desired to display the character 7, the brushes of the related commutator 38 establish contact during the scanning of the 7 main segment of the disk 40 and with one of the commutators such as 38d effective the resistor 78a is shunted out, thereby allowing impingement of the electron beam with the resulting display of the character on the screen. These shunting circuits will now be described in detail.

Keyboard and commutator wiring

Referring now to Fig. 9a, which at the bottom of the figure shows the keyboard wiring, it will be noted that the contacts 29 for the units order keys are connected to a line 30U which extends to one side of the 38f commutator. The contacts 29 of the keyboard pertaining to the tens order connect to a line 30T which extends to one side of the 38e commutator. The contacts 29 pertaining to the hundreds order connect to a line 30H which extends to one side of the 38d commutator. The opposite sides of all of the commutators 38d, 38e, 38f connect to a common line 82. At each cathode ray tube the line 82 connects to the negative end of the resistor 78a.

Referring again to Fig. 9a, the individual contacts 31 pertaining to the "9" keys are connected in common to a transverse line which extends to one side of the 38—9 commutator. The 31 contacts pertaining to the "8" keys connect to a transverse line which extends to one side of the 38—8 commutator and so on. It will be understood that an individual commutator 38 is provided for each different set of digital contacts 31. The opposite sides of the set of commutators 38—9 to 38—0 connect to a common line 83 which leads either through a supplemental commutator 38g or through a manually closed switch F to a line 83a which extends (see Fig. 9b) to the positive or upper end of the resistor 78a.

It will be assumed that the number 425 is set up on the keyboard. As shown by the timing diagram commutator 38d closes first, followed by 38e and 38f in the order named. As explained before, when 38d is closed, the beam impinges on the left hand zone of the screen, when 38e closes the beam impinges on the middle zone of the screen and when 38f closes, the beam is in the right hand zone. On closure of the number "4" commutator of the 38 set, a circuit is completed from the positive end of resistor 78a (Fig. 9b) via wire 83a, through switch F (Fig. 9a) now assumed closed, to wire 83, through the number "4" commutator of the 38 set, which closes at the cycle time shown in the timing diagram, through the number "4" key controlled contacts 29, 31 in the hundreds order, through the 30H line, through the 38d commutator to the line designated 82 which goes to the negative end of resistor 78a (see Fig. 9b). This action will completely shunt out the resistor 78a reducing the high negative bias on grid 13 and allowing the beam to impinge upon the screen 16 of each tube or tubes. Commutator 38a closes at the time shown in the timing diagram to cause the biasing network 60a, 61a and 59a to be effective to cause the character to be traced on the left hand zone of each tube. With the number "4" commutator of the 38 set effective and the 38d commutator effective, the high negative bias on the cathode ray tubes is reduced every time the photo-cells 46X and 46Y scan the 4a sub-segment of the disk 40. With such high negative bias so reduced, the potential of terminal 57 (Fig. 9a) will be applied through a line 87 and wires 88 to the XL plates of the various cathode ray tubes. The XR plates of the various tubes are connected back to the 58 terminal via wires 89 and line 90. Accordingly, the variations in potential across the terminals 57 and 58 will be applied to the XR and XL plates. The Y output terminal 66 connects to line 91, which connects to wire 92 leading to the YL deflecting plates. The YU deflecting plate is connected back to the 67 terminal through the wire 89 and line 90. In this way the Y deflecting voltages are applied to the YU and YL plates. This application of potentials to the deflecting plates of the various tubes will display 4 in the left hand zone of all the tubes.

The control circuits for the tens order display will now be traced. With the number 2 key depressed in the tens order on the keyboard, a circuit will be completed from the positive end of resistor 78a (Fig. 9b) to wire 83a, thence through switch F (Fig. 9a) now closed, to wire 83. Upon closure of the number 2 commutator of the 38 set, a circuit will be completed through the number 2 key controlled contacts 29, 31 in the tens order to common line 30T and upon closure of the 38e commutator this circuit will be completed to line 82 which extends over to the negative end of the 78a resistor. This circuit so completed will shunt out the 78a resistor and will remove high negative bias from the grid 13 of each cathode ray tube, thereby permitting an electron beam to impinge upon the screen of each tube in the center zone. The deflecting voltages are applied to the XL, XR, YL and YU plates in a similar manner as before explained, except that in this instance such deflecting voltages will be applied at the time when the photo-cells are scanning the number 2b sub-segments of the disk. At this time it will be recalled that the 38b commutators close, which applies proper biasing control to cause the beam to impinge on the center zone of each tube. It is not believed that the circuits need be traced in detail for the control in the units order. It is sufficient to state that when the 5 commutator of the 38 set closes its circuit, and the 38f commutator closes, high negative bias will be removed from the grids of all tubes to allow impingement of the electron beams on the screens thereof. Such display will be in the right hand zone due to the timing of the 38c commutator. The deflecting voltages will be applied to the plates of the various tubes when the photoelectric cell is scanning the 5c sub-segment of the disk.

In some cases it may be desirable to have the display devices flash the numbers instead of displaying them continuously. When it is desired to operate the apparatus with such flashing display, the operator opens the switch F (Fig. 9a). Referring to Fig. 3, it will be noted that the small motor 35a drives a commutator 38g. The brushes 39g with motor 35a in operation intermittently interrupt the high bias control circuit to the various tubes. It will be understood that the motor 35a can be set to operate at any speed and the commutator 38g can be proportioned to keep the high negative bias on the grids 13 of the cathode ray tubes for a certain period and remove it for another period. For example, the commutator might be arranged to close the circuit for half a second and interrupt it for half a second. This would provide for one-half second flashing display of the numbers by the various displaying units.

Summarizing, the operation of the main embodiment may be explained as follows: The general purpose of the 38—0 to 38—9 commutators is to remove high negative bias from the grids 13 of the different cathode ray tubes. Depending on the time when a particular commutator closes which is coordinated to the disk track main segments the related character will be displayed on the screen of the tube or tubes. The purpose of the 38a, 38b and 38c commutators is to selectively render the three biasing networks effective to cause tracing either in the left hand zone, the middle zone or the right hand zone. As shown in the timing diagram the 38a commutator closes first and the closure of this commutator circuit is concurrent with the closure of the 38d commutator pertaining to the hundreds order section of the keyboard. Accordingly, the hundreds order digit will be displayed on the left hand zone of each tube or tubes. Following the closure of the 38a and 38d commutators there is a concurrent closure of the 38b and 38e commutators. This affords display of the tens order digit in the middle zone of each tube. Following this there is a concurrent closure of the 38c commutator and the 38f commutator which affords a concurrent display of the units order digit on the right hand zone of each tube.

According to the modified embodiment of the invention the control apparatus which has previously been described in connection with the description of Fig. 3 is modified in the following manner. The previous shaft 37 is now split into two sections, viz. sections 37 and 37a (see Fig. 13). Three-to-one gearing 36a drives the 37 shaft section which in turn drives the 38 commutators and the disk or rotatable control element 40a. One-to-one gearing 36b drives the 37a commutator drive shaft with a one-to-one drive ratio. Shaft 37 makes three revolutions during one revolution of shaft 37a. Fixed on the shaft 37 are ten commutators, each of which is generally designated 38. One of these commutators is provided for each digit 1 to 9 with a further commutator being provided for zero. Each of the commutators 38 (see Fig. 9aa and timing diagram Fig. 10aa) comprises an insulated portion for the greater portion of the periphery of the commutator with a conducting portion at a single point on the commutator. Trailing on the periphery of each commutator is a pair of brushes which are generally designated 39 on Fig. 13. The conducting segments of the 38 set of commutators are so arranged to close at different angular positions of rotation of the shaft 37 as will be readily understood by inspection of Fig. 9aa and the lower portion of the commutator timing diagram shown in Fig. 10aa.

Shaft 37a is adapted to drive six commutators 38A, 38B, 38C, 38D, 38E and 38F. Each of these last mentioned commutators have conducting portions adapted to close their commutator controlled circuit for one-third of a revolution for each commutator. This will be clear by referring to the commutator timing diagram Fig. 10aa, upper portion. Trailing on the conducting portions of these latter commutators are pairs of brushes, one pair of which is designated 39a in Fig. 3. The purpose of the commutators 38A to 38F inclusive, and their timing will be subsequently further explained.

According to the modified embodiment of the invention, the track configuration of the rotatable control element is modified. In lieu of the disk shown in Fig. 5, which disk has main segment sections and sub-segment sections, the disk 40a which is used in the modified embodiment of the invention comprises main segment sections only. The configuration will be obvious from an inspection of Figs. 11 and 12 wherein it will be noted that the main section is identical in configuration with a sub-section of the previous disk except that it is extended over a greater arc. In other words, in place of having a main section with three sub-sections, a main section only is utilized and the track configuration in the main section is like the track configuration of the sub-section except that the track sections of the main section occupy 36 degrees of arc instead of 12 degrees of arc as in the main embodiment.

According to the modified embodiment, commutators 38A, 38B and 38C function in an identical manner for controlling their associated biasing networks as commutators 38a, 38b and 38c in the main embodiment. However, the timing of such modified commutators is different as will be clear by referring to the timing diagram (Fig. 10a). Commutator control devices 38D, 38E and 38F also function in a similar manner to commutators 38d, 38e and 38f in the main embodiment.

By referring to the timing diagram (Fig. 10aa) it will be noted that the commutators 38A and 38D make first and their circuits are established for one-third of a revolution of these commutators. During this same one-third of a revolution the commutators 38—0 to 38—9 inclusive and the disk 40a rotate through a complete revolution and during this complete revolution any one of the digits or 0 can be traced upon the screen of the tube. The tracing will be in the left hand zone due to the network control afforded by the commutator 38A and by the columnar control afforded by the 38D commutator. In the following one-third of a revolution of the commutators on the shaft 37a, the commutators 38A and 38D open their circuits and commutators 38B and 38E close their circuits. During the one-third of a revolution when these latter circuits are closed, the 38—0 to 38—9 commutators and the disk 40a again rotate through a complete revolution to afford proper tracing control for the display of any digit or digits. The display will be of the digits in the tens order due to commutator 38E and will be in the middle zone due to commutator 38B rendering the middle biasing network effective. The action for the following one-third of a revolution of the digit 37 includes the closing of the commutator circuits by commutators 38C and 38F and these commutators bring the biasing network and the units order columnar control into action at the time when the 38—0 to 38—9 commutators and the disk 40a rotates through a further complete revolution.

Summarizing, the operation of the modified embodiment may be explained as follows: The general purpose of the 38—0 to 38—9 commutators is to remove high negative bias from the grids 13 of the different cathode ray tubes. Depending on the time when a particular commutator closes which is coordinated to the disk track segments the related character will be displayed on the screen of the tube or tubes. The purpose of the 38A, 38B and 38C commutators is to selectively render the three biasing networks effective to cause tracing either in the left hand zone, the middle zone or the right hand zone. As shown in the timing diagram (Fig. 10aa) the 38A commutator closes first and the closure of this commutator circuit is concurrent with the closure of the 38D commutator pertaining to the hundreds order section of the keyboard. Accordingly, the hundreds order digit will be displayed on the left hand zone of each tube or tubes. Following the closure of the 38A and 38D commutators, there is a concurrent closure of the 38B and 38E commutators. This affords display of the tens order digit in the middle zone of each tube. Following this there is a concurrent closure of the 38C commutator and the 38F commutator which affords a concurrent display of the units order digit on the right hand zone of each tube.

According to the main embodiment the possible display of characters from the disk 40 for one complete rotation of the rotatable control element or light modifying disk may be stated to be as follows:

1119996663332224445557777000888

According to the modified embodiment the possible display of characters from the disk or light modifying rotatable element 40a for three complete revolutions thereof may be stated to be as follows:

1963245708, 1963245708, 1963245708

What is claimed is:

1. A character outline displaying apparatus including a single cathode ray tube having a screen upon which character outlines are traced and displayed, said cathode ray tube having electron deflection control elements, a common source for generating the changing potentials to be impressed upon the deflection control elements for deflecting an electron beam and for controlling the possible tracing of a set of different character outlines, means for selecting which character outline or outlines are to be displayed upon the screen under control of the source means, a plurality of supplemental biasing controls for applying biasing potentials to one of the deflection control elements which also receives said changing potentials to effect a supplemental displacement of the electron beam to any one of a plurality of zones upon the tube screen, and means for bringing said supplemental biasing controls into action whereby a plurality of character outlines may be traced and displayed upon a single screen of a single tube.

2. A character outline displaying apparatus including in combination, a source of varying potentials for controlling the deflection of an electron beam in a cathode ray tube whereby the latter may variably trace different character outlines, a single cathode ray tube having a screen and having deflection control elements connected to receive the varying potentials from said source to cause the electron beam to trace a character outline upon the screen thereof, a plurality of biasing control devices for applying changed biasing voltages to the deflection control elements which receive varying tracing potentials, and timing means for bringing said biasing control devices into action successively for effecting successive supplemental displacement of the electron beam to various lateral zones of the screen at successive times determined by the timing means whereby character outlines may be displayed at different lateral zones upon the screen of a common tube at successive times.

3. The invention according to claim 1 wherein the source of varying potentials includes as a control a single rotating element having light tracks divided into main segment sections, one for each different character to be displayed, and wherein each main section comprises a plurality of sub-sections to afford repeated display of the same character.

4. A cathode ray character displaying apparatus with a cathode ray tube having deflecting plates and a screen, a source of varying potentials for controlling deflection of an electron beam in said cathode ray tube to control tracing of character outlines and afford display of character outlines on the screen thereof, said source including a rotatable control element, means to repeatedly rotate said element; and including in combination, supplemental source means affording a plurality of different supplemental biasing voltages for application to certain of the deflecting plates of the tube, said certain of the deflecting plates also receiving the varying traced controlling potentials from the first mentioned source, and means operative upon successive rotation of said element for selectively connecting said supplemental source means to the deflecting plates of the tube to selectively change the supplemental biasing voltage thereon so that upon successive rotation of the element character outlines are traced under control of the element and displayed at different laterally spaced zones on the screen of the cathode ray tube under control of the connected supplemental biasing source means.

5. A cathode ray character displaying apparatus with a cathode ray tube having deflecting plates and a screen, a source of varying potentials for controlling deflection of an electron beam in said cathode ray tube or tubes to control tracing of character outlines and afford display of character outlines on the screen thereof, said source including a rotatable control element, means to rotate and angularly displace said element; and including in combination, supplemental source means affording a plurality of different supplemental biasing voltages for application to certain of the deflecting plates of the tube, said certain of the deflecting plates also receiving the varying traced controlling potentials from the first mentioned source, and means operative upon displacement of the aforesaid element to variable angular positions during one revolution thereof for selectively connecting said supplemental source means to the deflection plates of the tube to selectively change the supplemental biasing voltage thereon so that upon successive angular displacement of the element during one revolution thereof character outlines are traced under the control of the element and displayed at different laterally spaced zones on the screen of the cathode ray tube under control of the connected supplemental biasing source means.

6. A number displaying apparatus according to claim 2 wherein the timing means for bringing the biasing control devices into action comprise commutator devices which rotate in synchronism with a rotatable element, said rotatable element comprising the control element for the source of varying potentials.

7. A number displaying apparatus according to claim 2 wherein the source of varying potentials includes a rotatable control element and wherein the timing means includes commutators rotating in time with the control element and establishing control circuits for the biasing control devices during successive revolutions of the control element.

8. A number displaying apparatus according to claim 2 wherein the source of varying potentials includes a rotatable control element and wherein the timing means includes a set of commutators rotating in synchronism with the control element for successively establishing different control circuits for the biasing control devices during a single revolution of the control element.

JAMES W. BRYCE.